No. 716,502. Patented Dec. 23, 1902.
J. H. WESSON.
BALING PRESS.
(Application filed Apr. 17, 1902.)
(No Model.) 2 Sheets—Sheet 1.
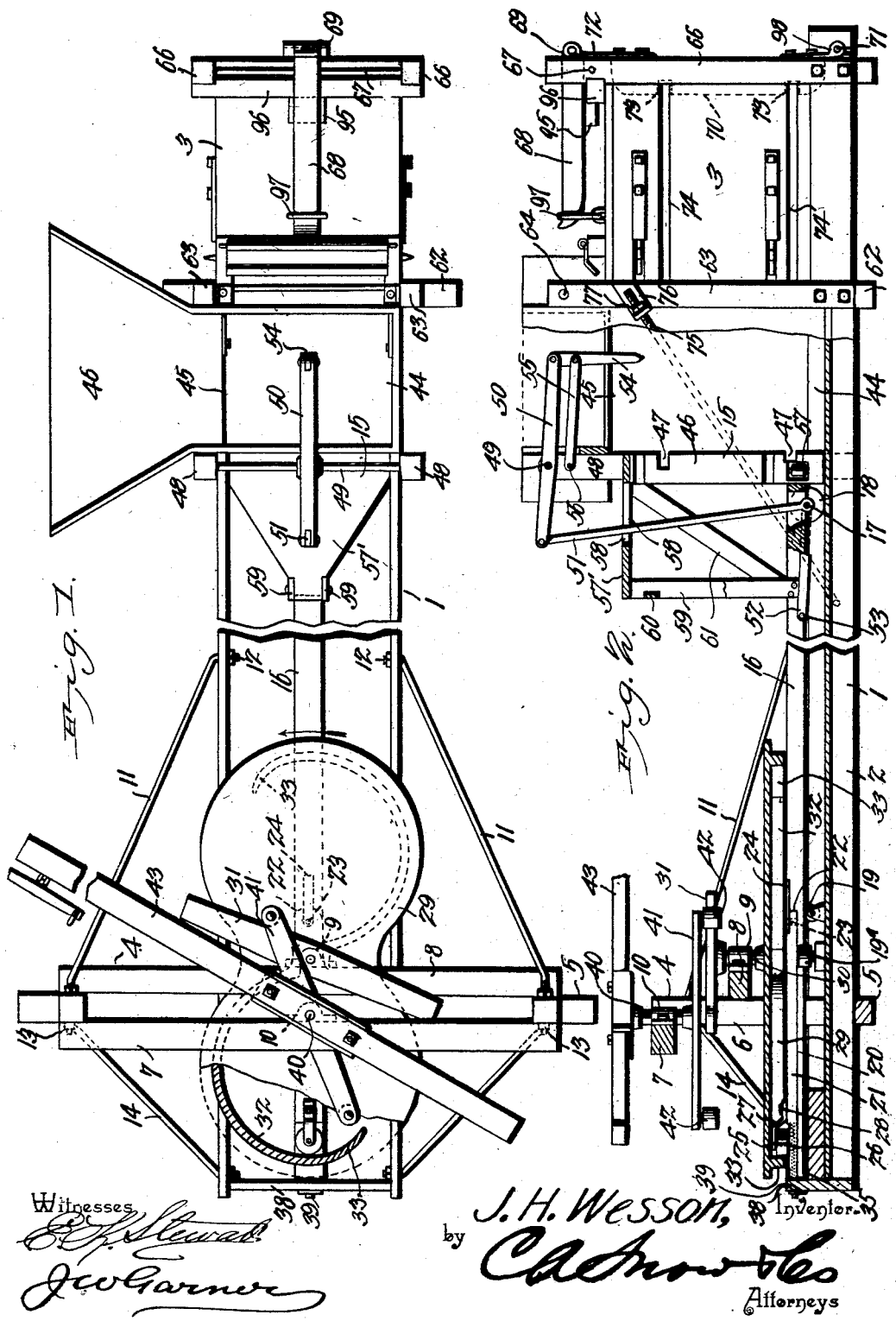

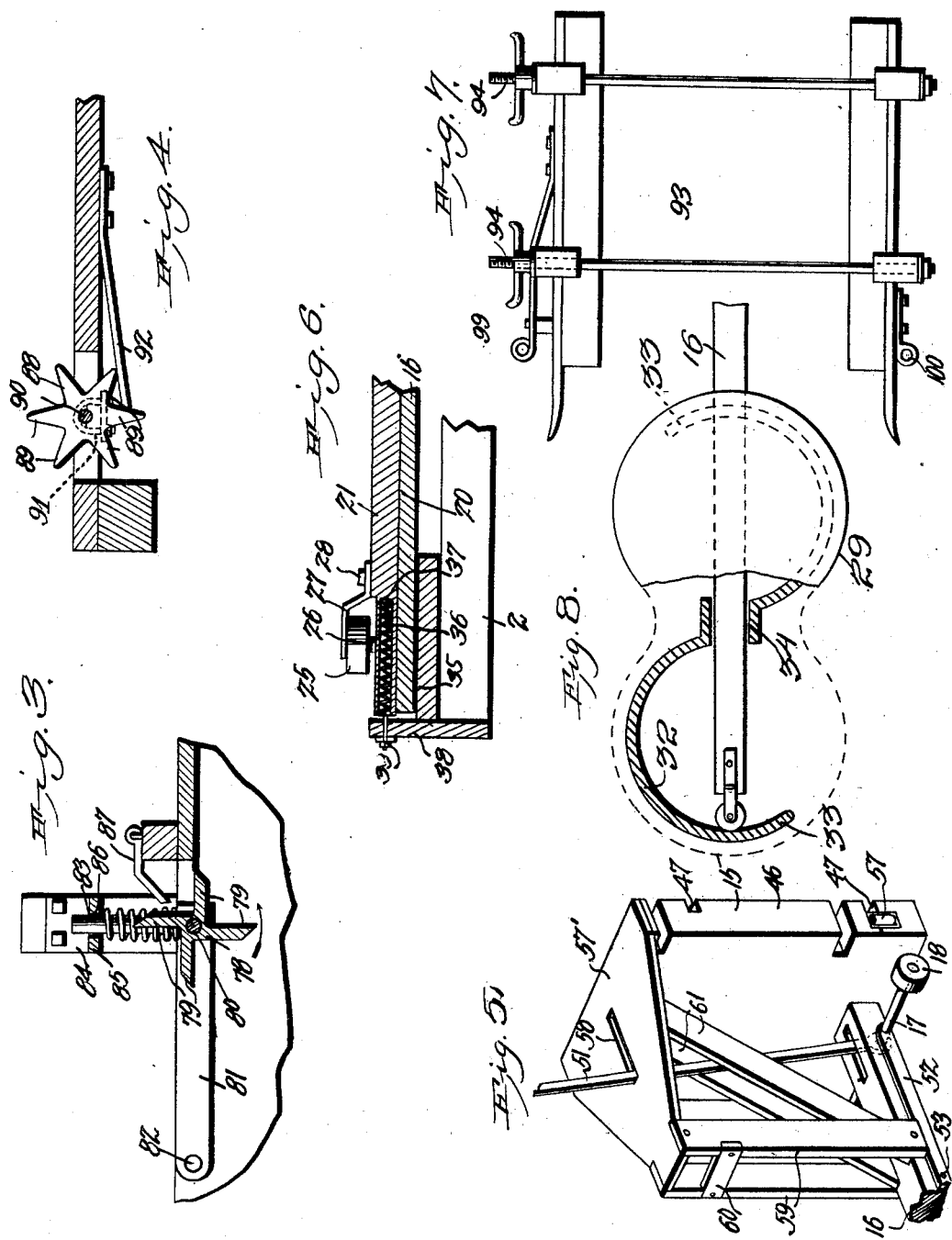

UNITED STATES PATENT OFFICE.

JAMES HENRY WESSON, OF ATTALLA, ALABAMA.

BALING-PRESS.

SPECIFICATION forming part of Letters Patent No. 716,502, dated December 23, 1902.

Application filed April 17, 1902. Serial No. 103,375. (No model.)

*To all whom it may concern:*

Be it known that I, JAMES HENRY WESSON, a citizen of the United States, residing at Attalla, in the county of Etowah and State of Alabama, have invented a new and useful Baling-Press, of which the following is a specification.

My invention is an improved press for baling hay, straw, shucks, and other material; and it consists in the peculiar construction and combination of devices hereinafter fully set forth and claimed.

In the accompanying drawings, Figure 1 is a top plan view of a baling-press embodying my improvements. Fig. 2 is partly a side elevation and partly a longitudinal sectional view of the same. Fig. 3 is a detail sectional view showing a portion of the baling-chamber, the revolving folder, which operates in the front end of the upper side thereof, and the means for carrying the said folder. Fig. 4 is a detail sectional view showing one side of the baling-chamber and showing one of the revolving dogs therein. Fig. 5 is a detail perspective view of the plunger. Fig. 6 is a detail sectional view showing the outer portion of the plunger-bar and the spring connected thereto. Fig. 7 is a detail elevation of the rear portion of the baling-chamber. Fig. 8 is a detail inverted plan view of the plunger-operating cam.

In the embodiment of my invention I provide a main frame 1, which is here shown as comprising sills 2, connected together by suitable cross-bars. At one end of the said frame is a baling-chamber 3, and on the opposite end thereof is a frame 4, which I will now describe.

The cross-bar 5 is secured under the sills 2 at a suitable distance from one end thereof, and the said cross-bar projects laterally beyond the said sills and the frame 1 to a suitable extent. Vertically-disposed studs 6 are secured on the said cross-bar 5 near the ends thereof and are connected together at their upper ends by a cross-bar 7, which is disposed on the outer sides of said studs. A suitable cross-bar 8 is secured to the said studs on the side opposite the cross-bar 7 and at a suitable distance below the same. On the center of the said cross-bar 8, on the inner side thereof, is secured a bearing 9. On the inner side of the bar 7, at the center thereof, is secured a bearing 10. A pair of brace-rods 11 have their inner ends secured to the sills 2, as at 12, Fig. 1, and their outer ends passed through and secured to the studs 6, as shown in dotted lines at 13. Brace-rods 14 also connect the outer ends of the sills to the said studs 6 or other suitable portion or member of the frame 4. Within the scope of my invention the frame 4 may be of any suitable construction and may be braced by any suitable means, and I do not limit myself in this particular. It is desirable in the practical construction of the said frame to secure the various members thereof together by bolts, so that the same may be readily disassembled.

I will now describe my improved means for operating the plunger 15. The said plunger has an outwardly-extending plunger-bar 16, the inner portion of which is supported on an axle 17, that is provided with antifriction-rollers 18, which travel on the floor between the sills of the frame 1. Near the outer end of the frame 1 is mounted a transversely-disposed antifriction-roller 19, on which the plunger-bar 16 bears, the said roller 19, together with the rollers 18, serving to reduce friction, as will be understood. Guide-rollers 19$^a$ bear on opposite sides of the plunger-bar. The plunger-bar has its upper side cut away or rabbeted for a suitable distance from its outer end, as at 20, and in the said cut-away portion of the said plunger-bar is disposed a section 21 of the plunger-bar, the inner end of which section is semicircular in shape and abuts against a similarly-shaped shoulder with which the plunger-bar is formed, as shown in dotted lines at 22 in Fig. 1. The said inner end of the section 21 is pivoted to the plunger-bar 16, the pivot being indicated at 23. As here shown, the upper end of the pivot is supported by a metallic strap 24, which engages it, and which strap has its inner portion secured on the plunger-bar. On the upper side of the pivoted section 21, near the outer end thereof, is a roller 25, which is mounted for rotation on a vertically-disposed axle-bolt 26. The lower portion of the said bolt extends through the pivoted section 21, and the head of the said axle-bolt is countersunk in a brace-strap 27, which is here shown as secured on the pivoted section 21 by a bolt 28. It will be understood from the foregoing and observed by reference to the drawings that the said roller 25 is mounted on the upper side of the pivoted section of the plunger-bar, where it is within the path of a revoluble cam 29. The said cam 29 is secured at its center to the lower end of a vertically-disposed shaft 30, which is journaled in the bearing 9. On the upper end of the said shaft is secured a cross-arm 31, which is fixed to the shaft and is disposed at a suitable angle with relation to the cam 29. The latter is here shown as a substantially 8-shaped plate or web 32, on the under side of which are a pair of reversely-disposed volute or substantially hook-shaped cam-flanges 33. The inner ends of the said cam-flanges terminate near the center of the cam 32 considered as a whole, and an opening 34 is formed between the said reversely-disposed cam-flanges. Said opening is coincident with the pivotal axis of the cam. The flanges are respectively radial with reference to the central shaft 30 of the cam, and the opening 34 is of such width as to enable the roller 25 to lie therein directly under the center of the cam, so that as the cam is revolved in the direction indicated by the arrow in Fig. 1 the said roller after having been moved inwardly by the outermost cam-flange to impart a compressing stroke to the plunger will lie in the said opening, thereby causing the plunger to "dwell" at the inner end of its instroke to effectually press the material engaged thereby until the cam 32 has moved through nearly half a revolution, so that the sides of the opening 34 clear the roller 25, when the spring 35 will cause the plunger to rebound and the said roller to engage the other cam-flange. Hence the plunger will be caused to reciprocate, as will be understood. It will be observed that owing to the shape of the cam-flanges the plunger will be moved inwardly on its compressing stroke with comparative rapidity during its initial movement and with constantly diminished speed as the rotation of the cam causes the roller to near the center of the cam, and hence the power of the plunger will be increased and its speed correspondingly diminished as it compresses the material more densely.

The rebounding-spring 35 is here shown as disposed in a bore 36 in the outer end of the section 21, with its inner end secured to said section, as at 37, and its outer end secured to a cross-bar 38, which connects the outer ends of the said sills 2 together, as at 39. The rebounding or retracting spring is here shown as a coiled extensile spring. Within the scope of my invention any suitable spring or other means may be employed for imparting the out or rebounding strokes to the plunger, and I do not desire to limit myself in this particular.

I will now describe my improved means for rotating the cam 32. A vertically-disposed shaft 40 is journaled in the bearing 10. To the lower end of the said shaft is secured a cam-bar 41, which extends in opposite directions from said shaft, the arms of said cam-bar being equal in length, and the said cam-bar carries at the ends of its arms antifriction tappet-rollers 42, which depend therefrom and are adapted, respectively, to engage the opposite arms of the cross-bar 31. To the upper end of the said shaft 40 a sweep or other suitable lever 43 is secured, by means of which said shaft 40 and said cam-bar may be rotated. The shaft 40 is eccentrically disposed with reference to the shaft 30, which forms the center of the cam 32, and it will be understood from the foregoing and by reference to Fig. 1 of the drawings that when the sweep-lever is rotated the tappet-rollers 42 will successively engage opposite sides of the respective arms of the cross-bar 31, and hence will impart rotary motion to the said cross-bar 31 and cam 32, which is rotated thereby. It will be further understood that the said cam-bar and cross-bar form levers which coact to increase the power of the cam and the plunger, which is operated thereby. While the said coacting cross-bar and cam-bar constitute one feature of my invention and are specifically claimed herein, I do not desire to limit myself to their use in connection with the cam which operates the plunger, as obviously the cam could revolve by other suitable means without departing from the spirit of my invention.

A bottomless feed-hopper 44 is disposed over the baling-chamber 3 at the front or inner end thereof and communicates therewith. One side of the said feed-hopper is open, as at 45, and a platform 46 communicates with and leads to the said open side of the hopper, so that material may be fed from the said platform to the said hopper and caused to fall from the latter into the front portion of the baling-chamber and in rear of the plunger 15. The said plunger is here shown as having a solid head 46, on the inner side of which are suitable grooves 47, of which there may be any suitable number, to admit of the insertion of the wires or bands which are used for tying the bales. A pair of standards 48 project from the upper side of the press-box at the sides thereof, and the said standards carry an axle-bar 49, on which is fulcrumed a lever 50. The outer end of the said lever is connected by a pitman 51 to the axle 17, which carries the rollers 18. A link 52 is disposed on the under side of the plunger-bar. Its outer end is pivotally connected to the plunger-bar, as at 53, and its inner end is connected to the axle 17. To the inner end of the lever 50 is pivoted a depending vertically-disposed feed-plunger 54. The same is adapted to feed the material downwardly from the hopper into the front portion of the baling-chamber and in rear of the plunger 15, and it will be understood that the said feed-plunger operates simultaneously with the compressing-plunger, is lowered to feed the material into the baling-chamber as the compressing-plunger moves outwardly, and is raised to clear the compressing-plunger as the latter moves inwardly on its compressing stroke. A link 55 is here shown as pivotally connected to the feed-plunger and with its outer end pivoted at a fixed point, as at 56, the function of the said link being to maintain the feed-plunger in a vertical position under all conditions. The axle 17, the rollers 13, and the pivoted link 53 form a supporting-truck for the plunger, and since the lever 50 of the feed-plunger is connected directly to the supporting-truck by the pitman 51 it will be understood that the stress exerted by the feed-plunger on its downstroke is entirely borne by the truck and not by the compressing-plunger, so that the latter is free to adjust itself and is permitted to move more easily and with less friction than would be the case if the pitman 51 were connected directly to said compressing-plunger. In the sides of the compressing-plunger 15 are anti-friction-rollers 57, which operate on the inner sides of the vertical walls of the baling-chamber.

The top 57' of the plunger 15 extends outwardly from the upper side of the plunger head or block 46 and has a slot 58, in which the pitman 51 operates. A pair of studs 59 have their lower ends secured to the plunger-bar 16 and their upper ends secured to the outer end of the top 57'. A cross-bar 60 connects the said studs together near their upper ends to brace them laterally, and a pair of inclined braces 61 have their lower ends bearing on and secured to the plunger-bar 16 and their upper ends bearing against and secured to the upper outer portion of the head or block 46 of the plunger. This construction of the plunger makes the same exceedingly strong and durable without making the plunger unduly heavy.

The baling-chamber 3 may within the scope of my invention be of any suitable construction. Preferably the parts thereof are secured together in practice by bolts, so that the same may be readily disassembled. As here shown, a cross-bar 62 is secured transversely under the sills and the bottom of the baling-chamber at a suitable distance from the mouth or inner end of the baling-chamber, and a pair of vertical studs 63 are secured to the said cross-bar and are disposed on the sides of the baling-chamber. The upper ends of the said studs 63 project above the baling-chamber to a considerable extent, and the said studs have their upper ends connected together by a bolt-rod 64. The standards 48, hereinbefore described, are similar studs, which are disposed on the sides of the baling-chamber or press-box at the mouth thereof, and the fulcrum which supports the lever 50 is a bolt-rod 65, which connects the upper end of said standards or studs. At the rear end of the press-box or baling-chamber, on the sides thereof, are similar studs 66, the upper ends of which project above said baling-chamber and are connected together by a brace-rod 67. A lock-bar 68 has at its outer end a member 69 of a hinge connection, with a head 70, which I will now describe. The said head is employed in the outer end of the press-box when the press is first put in operation and during the formation of the first bale. The said head 70 has its lower end detachably connected to the main frame or bottom of the press-box by hinged connections 98, including removable pintle-rods 71, and the said head is provided on its upper side with a hinge member 72, which when the same registers with the hinge member 69 may be connected to the bar 68 by a removable pintle-rod, thereby securing the head 70 in position to close the outer end of the press-box or baling-chamber, as shown in Fig. 2. The head 70 is provided on its inner side with transverse grooves 73, which are coincident with the grooves 47 in the compressing-plunger and are adapted for the insertion of the binding wires or bands. In the sides of the press-box are the usual openings 74 for the same purpose. In practice the press-box will be provided with any suitable number of said openings, and the compressing-plunger and head 70 will be likewise provided with a corresponding number of grooves. To add to the strength of the baling-chamber, I here show a pair of stay-rods 75, the lower ends of which are secured to the sills 2 and the upper ends of which pass through openings in brackets 76, that are bolted or otherwise secured to the outer sides of the studs 63. The upper portions of the said stay-rods are screw-threaded and provided with nuts 77, which bear on the brackets 76 and by means of which said stay-rods may be put under the requisite tension to effectually brace the baling-chamber.

In the upper side of the baling-chamber, at a point slightly in rear of the hopper 44, is disposed a revoluble folder 78, which is preferably of the form shown in Fig. 3 and is provided with radial wings 79. The said revoluble folder is normally disposed with its lower side somewhat below the upper side of the baling-chamber, so that it is in the path of the material to be compressed by the instrokes of the compressing-plunger. The axle of the said revoluble folder, which is here shown as a rod 80, has its ends secured to the upper ends of a pair of links 81, which are disposed next the vertical sides of the baling-chamber on the inner sides thereof and under that portion of the open upper side of the baling-chamber which is under the hopper 44. The front ends of the said links 81 are pivotally supported, as at 82. The revoluble folder extends substantially entirely across the upper side of the press-box, and the inner ends of the links 81, which carry the revoluble folder, are supported by vertically-disposed rods 83 and brackets 84, the latter being bolted or otherwise secured to the inner sides of the studs 63 above the baling-chamber and having horizontal inwardly-extending arms 85, provided with openings 86, in which the rods 83 are guided.

In the vertical side walls of the baling-chamber at points somewhat in rear of the revoluble folder are disposed revoluble dogs 88, the function of which is to engage the material as it is compressed and prevent the same from expanding outwardly as the plunger recedes. The said revoluble dogs are provided with projecting radial spurs 89, and the said dogs are so disposed that their inner sides project inwardly from the vertical side walls of the baling-chamber. Within the scope of my invention the said revoluble dogs may be mounted by any suitable means. I show short vertical shafts 90 for this purpose, which are disposed in recesses in the side walls of the baling-chamber and the bearings of which are formed by clip-bolts 91, (shown in dotted lines in Fig. 4,) the arms of which project outwardly, so that the taps are on the outer sides of the baling-chamber. By this means the revoluble dogs may be readily removed when desired. A spring-detent 92 coacts with each of the revoluble dogs, the said spring-detents having their outer ends bolted or otherwise suitably secured to the sides of the baling-chamber and having their free inner ends in engagement with the revoluble dogs, as shown in Fig. 4.

It will be understood that when the press is in operation each layer of material added to the bale in process of formation by the operation of the compressing-plunger will pass under and in engagement with the revoluble folder, the latter will be raised and partly rotated thereby, and one of the radial wings of the folder will fold the upper edge of the said layer downwardly. The revoluble folder rotates in the direction indicated by the arrow in Fig. 3, and the same is prevented from rotating in the reverse direction by a gravity-pawl 87. Hence the said revoluble folder coacts with the revoluble dogs to prevent the material in the baling-chamber from expanding in the direction of the compressing-plunger as the latter recedes. After the first bale has been formed and bound the head 70 is removed and the detachable bale-chamber 93, which forms a rearward extension of the baling-chamber, is attached to the latter. The said detachable bale-chamber is provided with compressing-screws 94, by means of which two of its sides are caused to converge rearwardly to retard the passage of the finished bales through the same, thus enabling the press to be continuously operated, as will be understood.

The lock-bar 68 has on its under side a cross-block 95, which when the head 70 is closed in the outer end of the baling-chamber and the bar 68 is turned to a horizontal position above the baling-chamber, as shown in Fig. 2, causes said block 95 to engage a bar 96, which is disposed transversely over the baling-chamber and in front of the upwardly-projecting portions of the studs 66. Hence the head 70 is securely locked in a closed position. Said lock-bar 68 is maintained in this position as long as may be required by a link 97.

Before removing the head 70 the lock-bar is disconnected therefrom. The head is then detached from the connections 98 by removing the pintle-rods 71. The bale-chamber 93 has connections 99 100, adapted to be respectively connected to the lock-bar and the connections 98 by the before-mentioned pintle-rods. Hence the chamber 93 is readily attached to the baling-chamber and securely held in position.

The press may be mounted on suitable trucks or a running-gear to enable it to be readily drawn from place to place. The cross-bars 5 62 on the under side of the press may be utilized as bolsters when the press is thus mounted.

Having thus described my invention, I claim—

1. In a baling-press, the combination with a baling-chamber and a plunger having a tappet, of a revoluble cam having oppositely-extended reversely-disposed cam-arms to successively engage the tappet, and an opening between the inner ends of said cam-arms and coincident with the pivotal axis of the cam, for the passage of the tappet from one cam-arm to the other as said cam revolves, the path of the plunger intersecting the pivotal axis of the cam, substantially as described.

2. In a baling-press, a plunger, a tappet carried thereby, and a spring to move the plunger outwardly, in combination with a revoluble cam having oppositely-extended reversely-disposed cam-arms to successively engage the tappet and an opening between the inner ends of said cam-arms and coincident with the pivotal axis of the cam, for the passage of the tappet from one cam-arm to the other as said cam revolves, the path of the plunger intersecting the pivotal axis of the cam, substantially as described.

3. In a baling-press, the combination of a plunger, a spring to move the same outwardly, a tappet carried by the plunger and movable laterally with respect to the path of the plunger, and a revoluble cam having oppositely-extended reversely-disposed cam-arms to successively engage the tappet and an opening between the inner ends of said cam-arms and coincident with the pivotal axis of the cam, for the passage of the tappet from one cam-arm to the other as said cam revolves, the path of the plunger intersecting the pivotal axis of the cam, substantially as described.

4. In a baling-press, the combination of a plunger having an outwardly-extended bar, a spring to move the plunger outwardly, a member pivotally mounted on the said bar and having a tappet, whereby the latter is adapted for lateral movement, and a revoluble cam having oppositely-extended reversely-disposed cam-arms to successively engage the tappet and an opening between the inner ends of said cam-arms and coincident with the pivotal axis of the cam for the passage of the tappet from one cam-arm to the other, the path of the plunger intersecting the pivotal axis of the cam, substantially as described.

5. In combination with a revoluble cam, a cross-bar revoluble therewith, a revoluble cam-bar having tappets to engage the respective arms of the cross-bar successively, the axis of said cam-bar being eccentric to that of said first-mentioned cam, and means to rotate said cam-bar, substantially as described.

6. In a baling-press, the combination of a plunger, a tappet carried thereby, a revoluble cam having oppositely-extended reversely-disposed cam-arms to successively engage said tappet, and an opening between the inner ends of said cam-arms to permit the passage of the tappet from one arm to the other, a cross-bar having its axis coincident with that of the said revoluble cam, and disposed at an angle with reference to the arms of the latter, a revoluble cam-bar having tappets, to engage the respective arms of the cross-bar successively, the axis of said cam-bar being eccentric to that of said first-mentioned cam, and means to rotate said cam-bar, substantially as described.

7. In a baling-press, the combination with a plunger and means to operate the same, of a supporting-truck for the plunger, said truck and plunger being connected for independent vertical movement, a feed-plunger, a lever to operate the same, and a pitman connecting the said lever to the said truck, substantially as described.

8. In a baling-press, the combination with a plunger and means to operate the same, of a supporting-roller for the plunger, a link pivotally connected to the axis of said roller and to said plunger, a feed-plunger, a lever to operate the same, and a pitman connecting said lever to the axis of said roller, substantially as described.

9. In a baling-press, the combination with a baling-chamber, and a plunger, of means to feed material to the path of the plunger, a revoluble folder, having projecting wings to successively engage one side of the material as it is compressed in the press-box, and means to prevent reverse rotation of said revoluble folder, substantially as described.

10. In a baling-press, the combination with a plunger, of a baling-chamber having an open end opposite that in which the plunger operates, and a bale-chamber, to form an extension of said baling-chamber and detachably secured to the open end thereof, substantially as described.

In testimony that I claim the foregoing as my own I have hereto affixed my signature in the presence of two witnesses.

JAMES HENRY WESSON.

Witnesses:
    WALTER F. GILLILAND,
    CHAS. S. COOPER.